United States Patent
Chen

(10) Patent No.: US 10,882,118 B2
(45) Date of Patent: Jan. 5, 2021

(54) HEATER FOR SHRINK FIT CHUCKS AND BLOCKING UNIT OF THE HEATER

(71) Applicant: SHINTEK MACHINERY CO., LTD., Taichung (TW)

(72) Inventor: Chih Hsiang Chen, Taichung (TW)

(73) Assignee: Shintek Machinery Co., Ltd., Taichung (TW)

( * ) Notice: Subject to any disclaimer, the term of this patent is extended or adjusted under 35 U.S.C. 154(b) by 82 days.

(21) Appl. No.: 16/352,911

(22) Filed: Mar. 14, 2019

(65) Prior Publication Data

US 2020/0290131 A1    Sep. 17, 2020

(51) Int. Cl.
    *B23B 31/00*         (2006.01)
    *B23B 31/117*       (2006.01)
    *B23P 11/02*         (2006.01)
    *F16B 4/00*          (2006.01)

(52) U.S. Cl.
    CPC ......... *B23B 31/1179* (2013.01); *B23P 11/027* (2013.01); *F16B 4/008* (2013.01)

(58) Field of Classification Search
    CPC .................................................. B23B 31/1179
    See application file for complete search history.

(56) References Cited

U.S. PATENT DOCUMENTS

2015/0151366 A1*    6/2015    Chen ................... B23B 31/1179
                                                          279/14

FOREIGN PATENT DOCUMENTS

JP            11077443 A *    3/1999         B23P 11/027

* cited by examiner

*Primary Examiner* — Jason Lau
(74) *Attorney, Agent, or Firm* — Rosenberg, Klein & Lee

(57) ABSTRACT

A heater for shrink fit chucks has a heating cover, a blocking piece, and an adjustable blocking set. The heating cover has a first through hole, a second through hole, and a heating space disposed within the heating cover, extending along an extending direction to form the first through hole and the second through hole, and communicating with a heat gun. The blocking piece is detachably connected to the heating cover to block the first through hole and has a communicating hole capable of communicating with the first through hole. The adjustable blocking set is connected to the heating cover and has two blade assemblies and a switching component. Each blade assembly has blades disposed annular along the extending direction. The switching component is rotatable and capable of pushing the blades to move toward or depart from each other for blocking the second through hole.

9 Claims, 8 Drawing Sheets

HEATER FOR SHRINK FIT CHUCKS AND BLOCKING UNIT OF THE HEATER

BACKGROUND OF THE INVENTION

1. Field of the Invention

The present invention relates to a device for assembling or removing a cutter from a chuck, and more particularly to a heater for shrink fit chucks with a blocking unit and an adjustable blocking set for adjusting the discharge of hot air.

2. Description of Related Art

A shrink fit chuck has a clamping bore for receiving and fastening a cutter. The shrink fit chuck has to be heated at first to enlarge the clamping bore to receive the cutter. Then the cutter is inserted into the clamping bore of the shrink fit chuck. When the shrink fit chuck cools down, the clamping bore shrinks and is capable of clamping the cutter to connect the shrink fit chuck and the cutter fixedly.

The shrink fit chuck is usually heated by an induction heater or by a heater with a heat gun. A conventional heater has a heat gun and a heating cover. The heat gun outputs hot air inside the heating cover. The heating cover has an upper end, a lower end, and a heating space. The upper end and the lower end of the heating cover are opposite each other. The heating space is disposed within the heating cover and extends to both the upper end and the lower end of the heating cover. The hot air provided by the heat gun is inducted into the heating space to heat the shrink fit chuck.

However, the heating cover of the conventional heater lacks blocking parts to block the upper end and the lower end of the heating cover. The hot air directly leaks via the upper end and the lower end of the heating cover without hindering. Therefore, the efficiency for heating the shrink fit chuck is low.

To overcome the shortcomings of the heating cover of the conventional heater, the present invention provides a heater for shrink fit chucks to mitigate or obviate the aforementioned problems.

SUMMARY OF THE INVENTION

The main objective of the present invention is to provide a heater for shrink fit chucks that has a blocking unit for adjusting flow of the hot air leaking from the heating cover to achieve stable heating.

The heater for shrink fit chucks comprises a heating cover, a blocking piece, and an adjustable blocking set. The heating cover has a first through hole, a second through hole, and a heating space disposed within the heating cover, extending along an extending direction to form the first through hole and the second through hole, and communicating with a heat gun. The blocking piece is detachably connected to the heating cover to block the first through hole and has a communicating hole capable of communicating with the first through hole. The adjustable blocking set is connected to the heating cover and has two blade assemblies and a switching component. Each blade assembly has blades disposed annularly along the extending direction. The switching component is rotatable and capable of pushing the blades of the two blade assemblies to move toward or depart from each other for blocking the second through hole.

Other objects, advantages, and novel features of the invention will become more apparent from the following detailed description when taken in conjunction with the accompanying drawings.

DETAILED DESCRIPTION OF PREFERRED EMBODIMENTS

Figure 1:
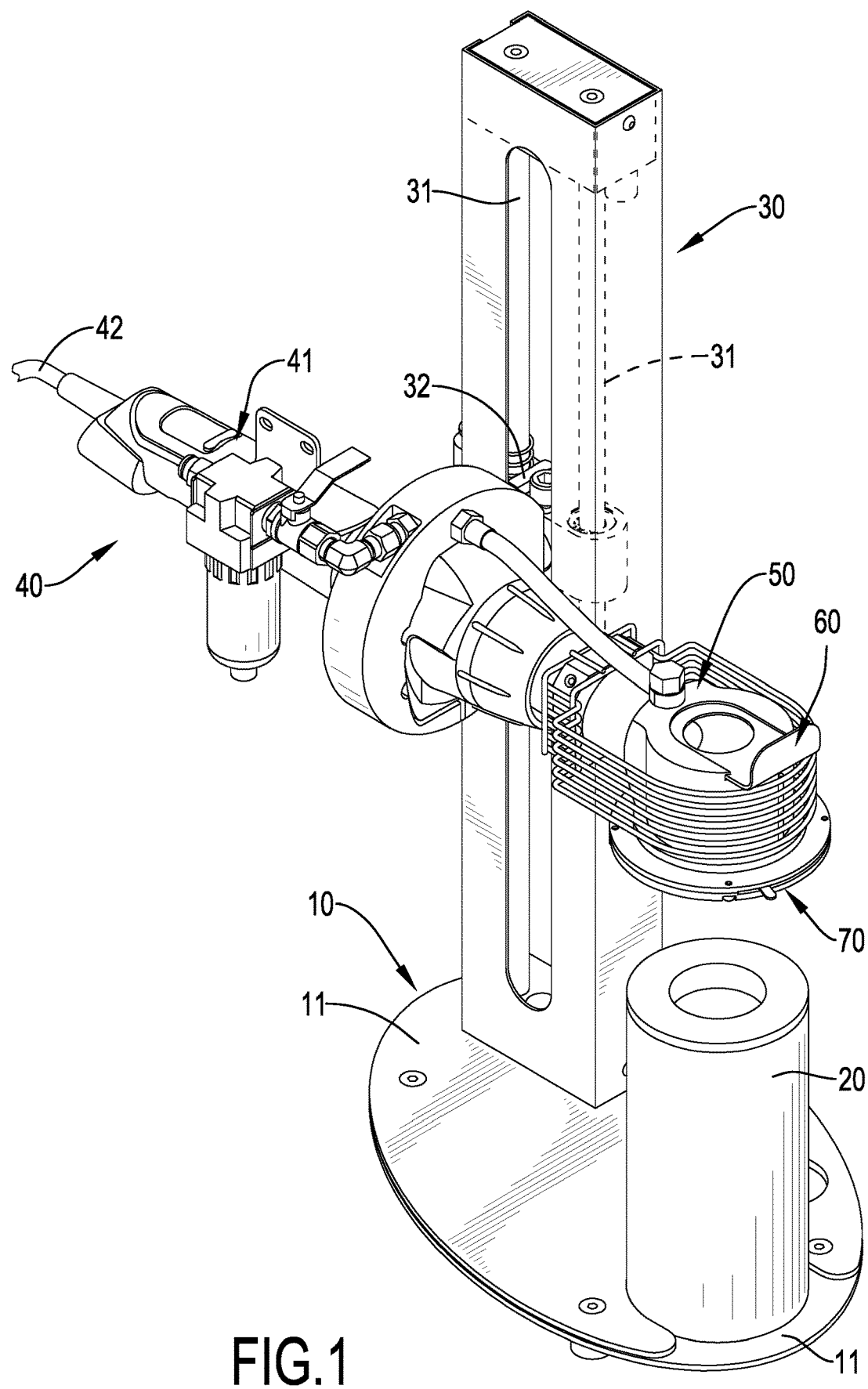
FIG. 1 is a perspective view of a heater for shrink fit chucks in accordance with the present invention.

With reference to FIG. 1, a heater for shrink fit chucks in accordance with the present invention has a base 10, a chuck mount 20, an elevating assembly 30, a heat gun assembly 40, a heating cover 50, and a blocking unit. The chuck mount 20 and the elevating assembly 30 are connected to the base 10. The heat gun assembly 40 is connected to the elevating assembly 30. The heating cover 50 is connected to the heat gun assembly 40. The blocking unit has a blocking piece 60 and an adjustable blocking set 70. The blocking piece 60 and the adjustable blocking set 70 are connected to the heating cover 50.

With reference to FIG. 1, the base 10 has an elliptical outline and two opposite ends 11.

With reference to FIG. 1, the chuck mount 20 is erectly connected to the base 10 and is disposed adjacent to one of the two opposite ends 11 of the base 10.

With reference to FIG. 1, the elevating assembly 30 is disposed adjacent to the other one of the two opposite ends 11 of the base 10. The elevating assembly 30 has two guiding shafts 31 and an elevating mount 32. The two guiding shafts 31 are erectly connected to the base 10 and are spaced from each other. The elevating mount 32 is mounted on and around the two guiding shafts 31 and is capable of moving up and down along the two guiding shafts 31 to move away from or to approach the base 10.

Figure 2:
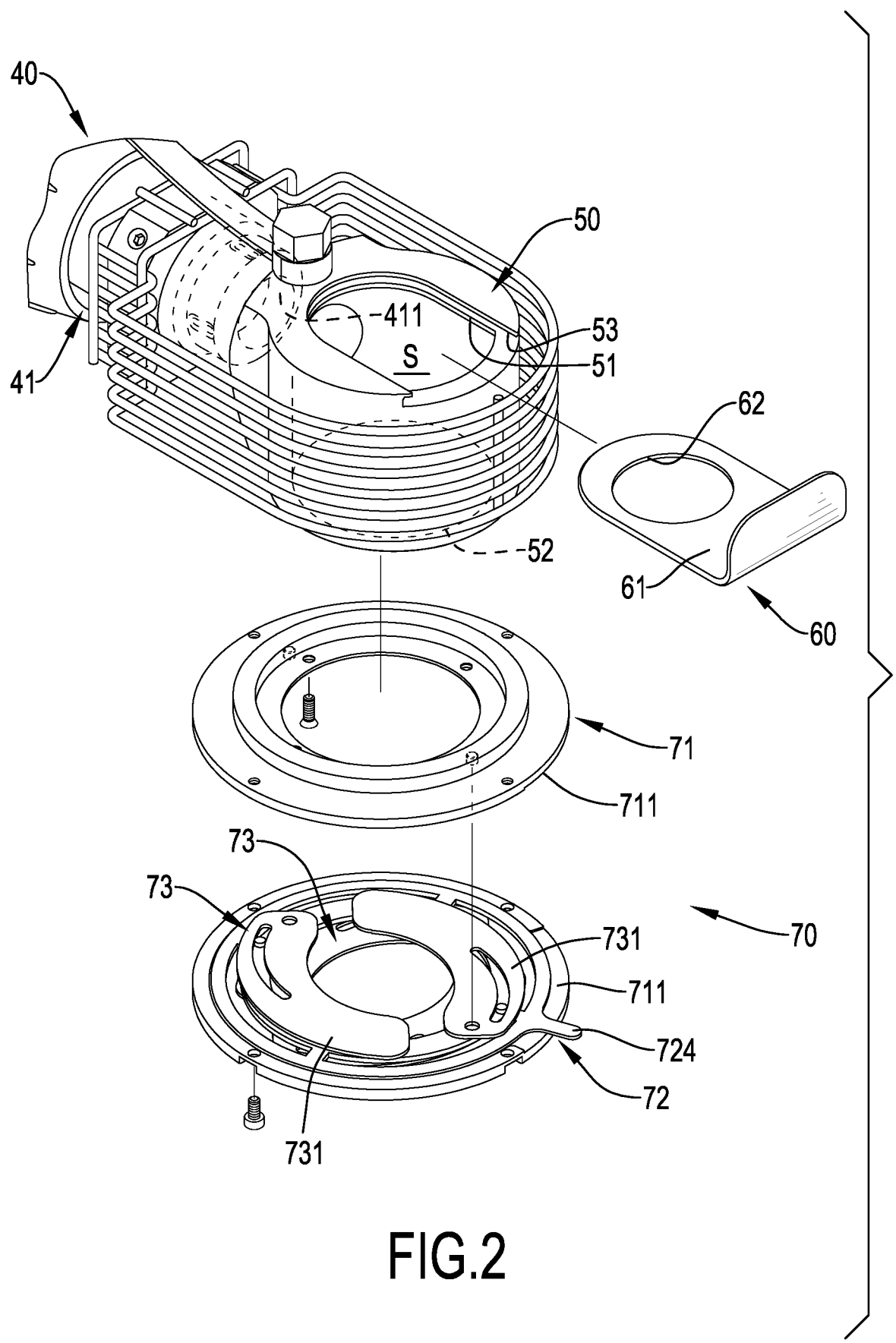
FIG. 2 is a partially and enlarged exploded perspective view of the heater in FIG. 1.

With reference to FIGS. 1 and 2, the heat gun assembly 40 is connected to the elevating mount 32 and is capable of moving up and down along the two guiding shafts 31 with the elevating mount 32. The heat gun assembly 40 has a heat gun 41 and an input tube 42. The heat gun 41 has two ends and an air outlet 411. The two ends of the heat gun 41 are opposite each other. The air outlet 411 is disposed at one of the two ends of the heat gun 41 and faces to the chuck mount 20. The input tube 42 is connected to the other end of the heat gun 41 and communicates with the air outlet 411.

With reference to FIGS. 1 and 2, the heating cover 50 is connected to the heat gun 41. The heating cover 50 has a heating space S, a first through hole 51, a second through hole 52, and a guiding groove 53. The heating space S is disposed within the heating cover 50 and extends along an extending direction to form the first through hole 51 and the second through hole 52. The guiding groove 53 has a U-shaped contour and is disposed adjacent to the first through hole 51.

With reference to FIGS. 1 and 2, the blocking piece 60 has a blocking body 61 and a communicating hole 62 formed through the blocking body 61. The blocking body 61 is detachably connected to the heating cover 50 and is capable of blocking the first through hole 51 partially and to let the communicating hole 62 communicate with the first through hole 51. In the embodiment of the present invention, the blocking body 61 is capable of being inserted into the guiding groove 53 of the heating cover 50 to be detachably connected to the heating cover 50.

Figure 3:
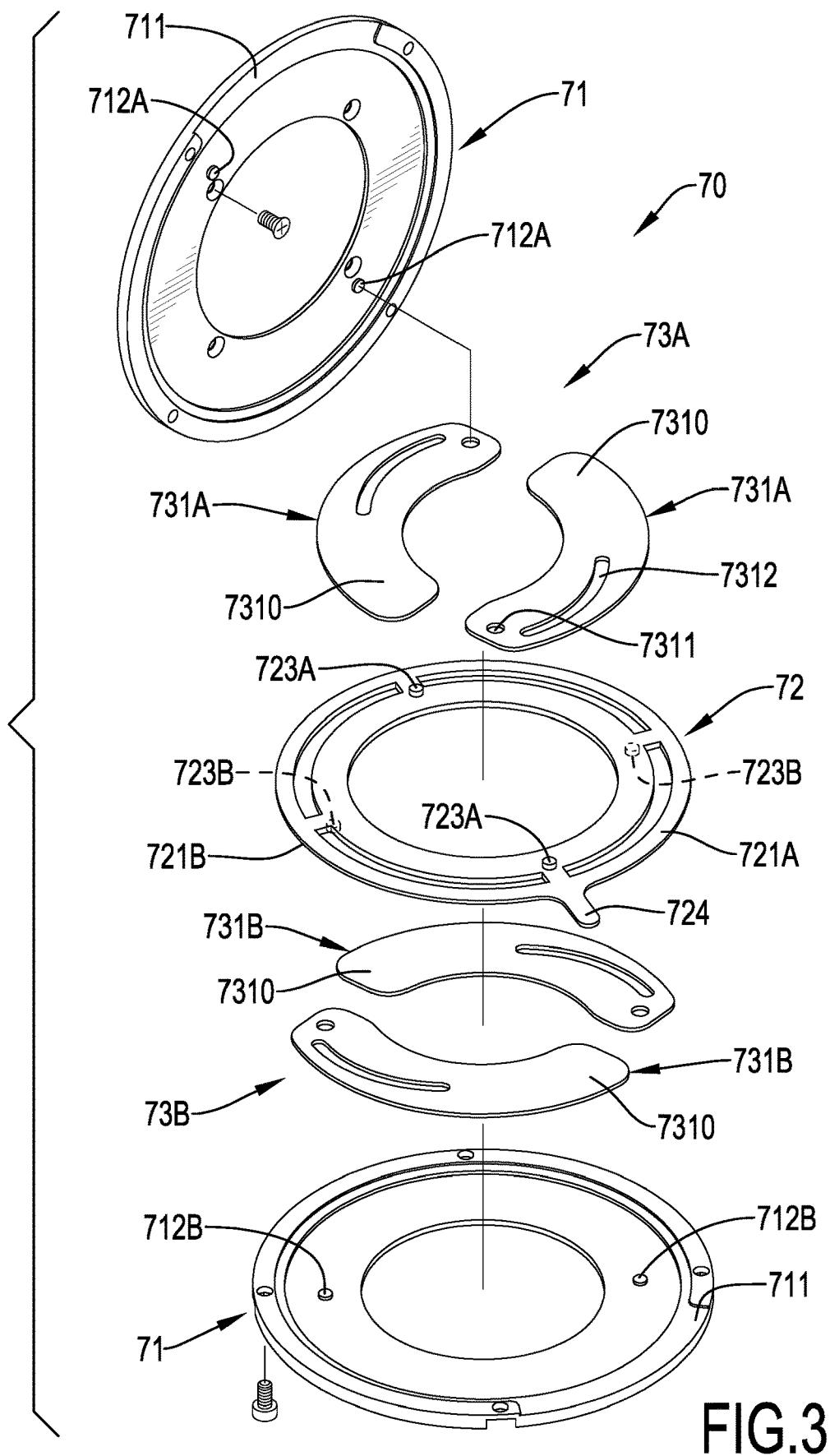
FIG. 3 is a detailed exploded perspective view of the heater in FIG. 1.

With reference to FIGS. 1 to 3, the adjustable blocking set 70 is connected to the heating cover 50 and has a housing 71, a switching component 72, and two blade assemblies 73. The housing 71 is connected to the heating cover 50 and has two shells 711, multiple first pivoting pillars 712A, and multiple second pivoting pillars 712B. The multiple first pivoting pillars 712A are formed on one of the two shells 711 and are annularly disposed along the extension direction. The multiple second pivoting pillars 712B are formed on the other one of the two shells 711 and are annularly disposed along the extension direction as well. The first shell 711A and the second shell 711B are connected to each other to form the housing 71. And the multiple first pivoting pillars 712A and the multiple second pivoting pillars 712B protrude toward each other. The multiple first pivoting pillars 712A and the multiple second pillars 712B are angularly offset.

With reference to FIG. 3, the switching component 72 is rotatably disposed within the housing 71. The switching component 72 has a switching body 721, multiple first guiding pillars 723A, multiple second guiding pillars 723B, and a manual protrusion 724. The switching body 721 has a first surface 721A and a second surface 721B facing to opposite directions. The multiple first guiding pillars 723A are formed on the first surface 721A of the switching body 721 and are annularly disposed along the extension direction. The multiple second guiding pillars 723B are formed on the second surface 721B of the switching body 721 and are annularly disposed along the extension direction. The multiple first guiding pillars 723A and the multiple second guiding pillars 723B protrude toward opposite directions. The manual protrusion 724 is formed on the switching body 721 and protrudes out of the housing 71 for operating by an user to make the switching body 721 rotate inside the housing 71.

With reference to FIG. 2, the two blade assemblies 73 are mounted inside the housing 71 and are respectively disposed adjacent to the first surface 721A and the second surface 721B of the switching body 721. The switching body 721 of the switching component 72 is disposed between the two blade assemblies 73. Each one of the two blade assemblies 73 has multiple blades 731. Each one of the multiple blades 731 has a blade body 7310, a pivoting hole 7311, and a guiding hole 7312. The blade body 7310 is curved and has a pivoting end and a sweeping end. The pivoting end and the sweeping end of the blade body 7310 are opposite each other. The pivoting hole 7311 is formed through the blade body 7310 and is disposed adjacent to the pivoting end of the blade body 7310. The guiding hole 7312 is formed through the blade body 7310. The guiding hole 7312 is a curved and elongated hole. The guiding hole 7312 elongates from the pivoting end of the blade body 7310 toward the sweeping end of the blade body 7310.

With reference to FIG. 3, the two blade assemblies 73 are further distinguished into a first blade assembly 73A and a second blade assembly 73B.

Each one of the multiple blades 731A is mounted on and around a respective one of the multiple first pivoting pillars 712A via the pivoting hole 7311 formed through the blade 731A, and is mounted on a respective one of the multiple first guiding pillars 723A via the guiding hole 7312 formed through the blade 731A. When the manual protrusion 724 of the switching component 72 is operated and the switching component 72 rotates, the multiple blades 731A of the first blade assembly 73A are respectively abutted by the multiple first guiding pillars 723A, and the multiple blades 731A of the first blade assembly 73A move toward or depart from each other to block or to reveal the second through hole 52 of the heating cover 50.

Each one of the multiple blades 731B is mounted on and around a respective one of the multiple second pivoting pillars 712B via the pivoting hole 7311 formed through the blade 731B and is mounted on a respective one of the multiple second guiding pillars 723B via the guiding hole 7312 formed through the blade 731B. Since the multiple first pivoting holes 712A and the multiple second pivoting holes 712B are angularly offset, the first blade assembly 73A and the second blade assembly 73B are angularly offset accordingly.

When the switching component 72 rotates, the multiple blades 731A of the first blade assembly 73A move toward or depart from each other, the multiple blades 731B of the second blade assembly 73B simultaneously move toward or depart from each other to block or to reveal the second through hole 52 of the heating cover 50.

Figure 4:
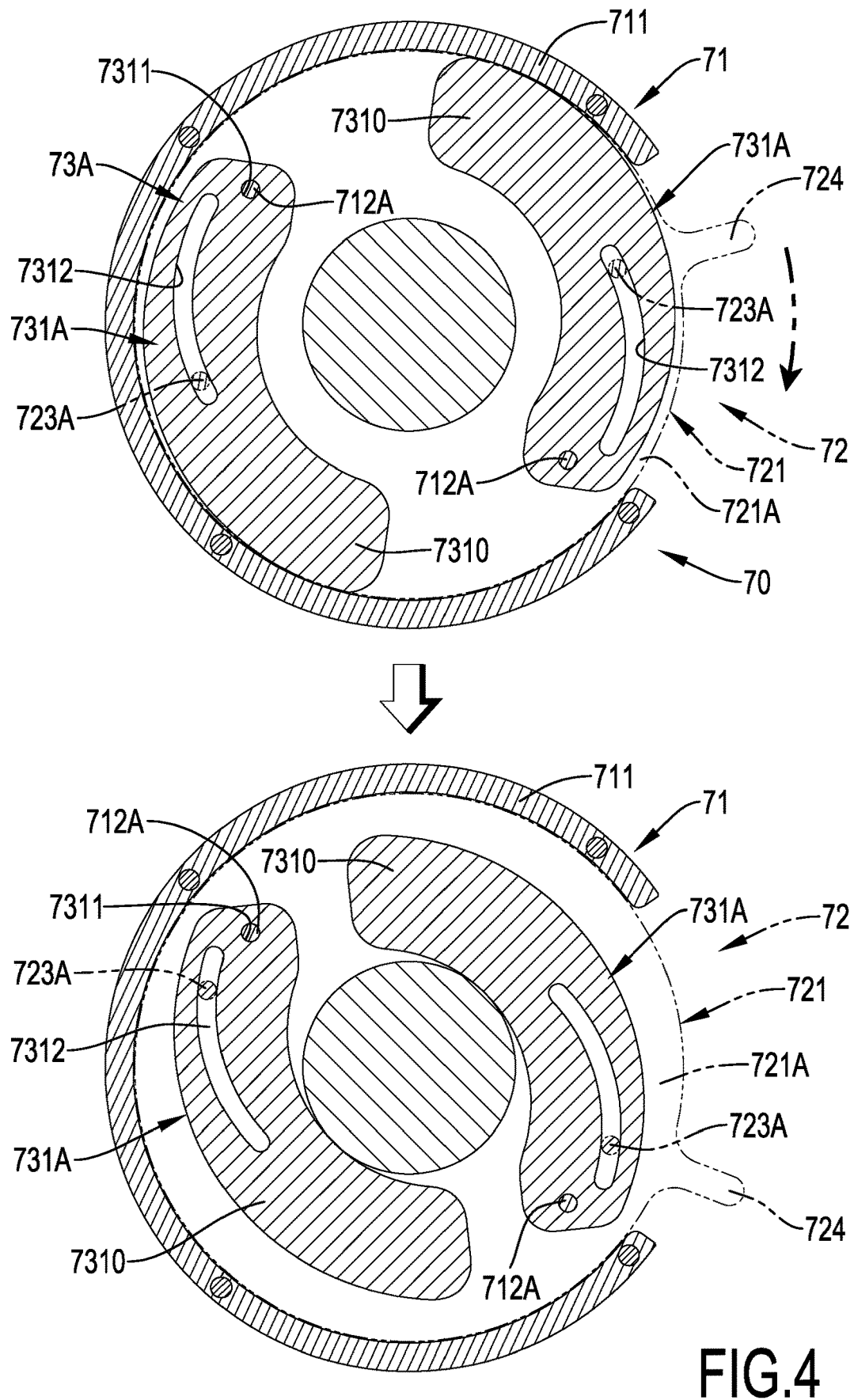
FIG. 4 is a schematic top view of an adjustable blocking set in FIG. 2.

With reference to FIG. 4, when the manual protrusion 724 of the switching component 72 is operated and the switching component 72 rotates in a clockwise direction, the multiple blades 731A of the first blade assembly 73A are respectively abutted by the multiple first guiding pillars 723A, and the multiple blades 731A of the first blade assembly 73A approach each other to block the second through hole 52 of the heating cover 50.

Figure 5:
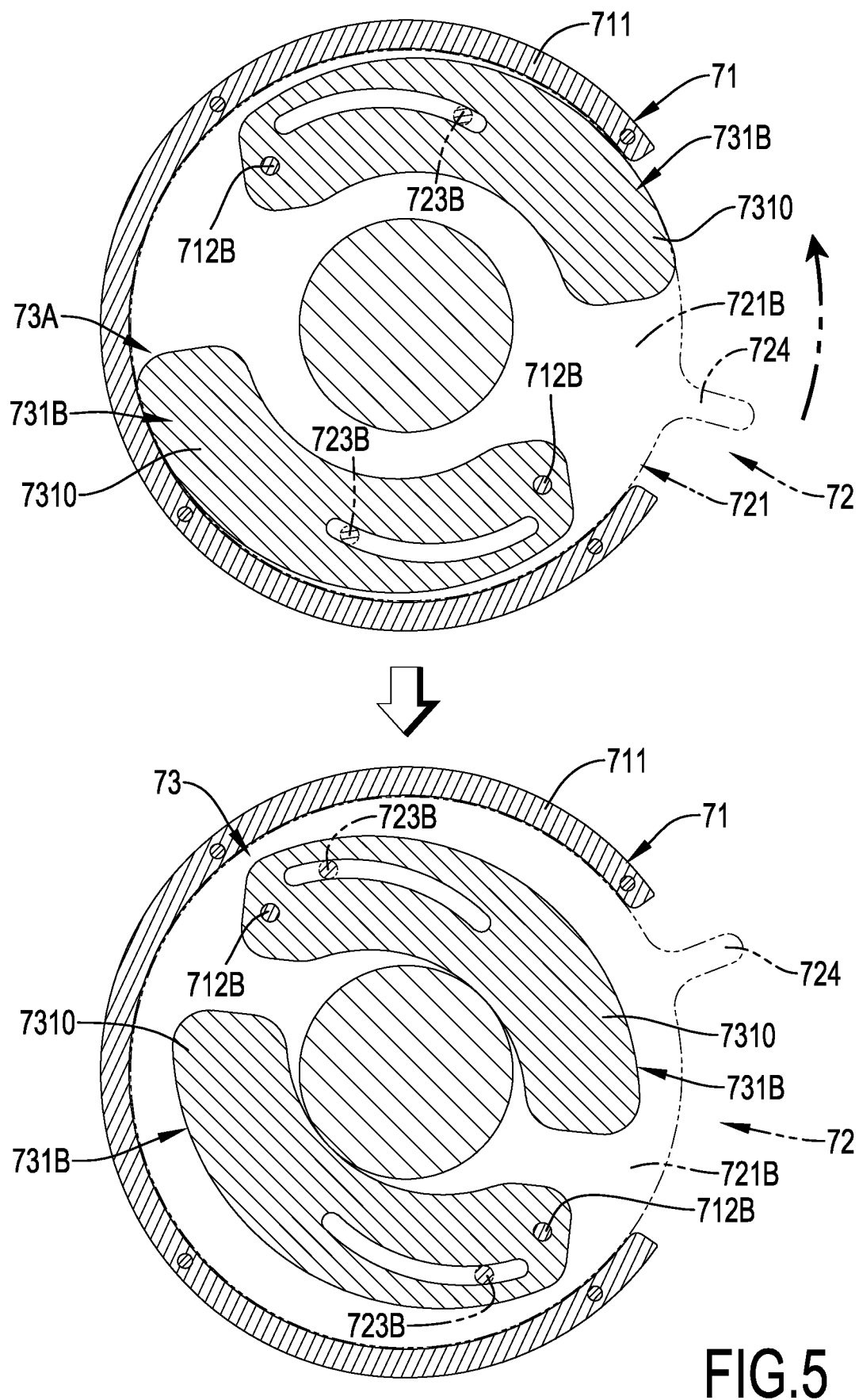
FIG. 5 is a schematic bottom view of the adjustable blocking set in FIG. 2.

With reference to FIG. 5, when the manual protrusion 724 of the switching component 72 is operated and the switching component 72 rotates in a counterclockwise direction, the multiple blades 731B of the second blade assembly 73B are respectively abutted by the multiple second guiding pillars 723B, and the multiple blades 731B of the first blade assembly 73B approach each other to block the second through hole 52 of the heating cover 50.

In the embodiment of the present invention, the multiple blades 731A of the first blade assembly 73A include two blades 731A, the multiple first pivoting pillars 712A of the housing 71 accordingly include two first pivoting pillars 712A, and the multiple first guiding pillars 723A of the switching component 72 accordingly include two first guiding pillars 723A. The amounts of the blades 731A of the first blade assembly, the first pivoting pillars 712A, and the first guiding pillars 723A are not restricted.

In the embodiment of the present invention, the multiple blades 731B of the second blade assembly 73B include two blades 731B, the multiple second pivoting pillars 712B of the housing 71 accordingly include two second pivoting pillars 712B, and the multiple second guiding pillars 723B of the switching component 72 accordingly include two second guiding pillars 723B. The amounts of the blades 731B of the second blade assembly 73B, the second pivoting pillars 712B, and the second guiding pillars 723B are not restricted as well.

Figure 6:
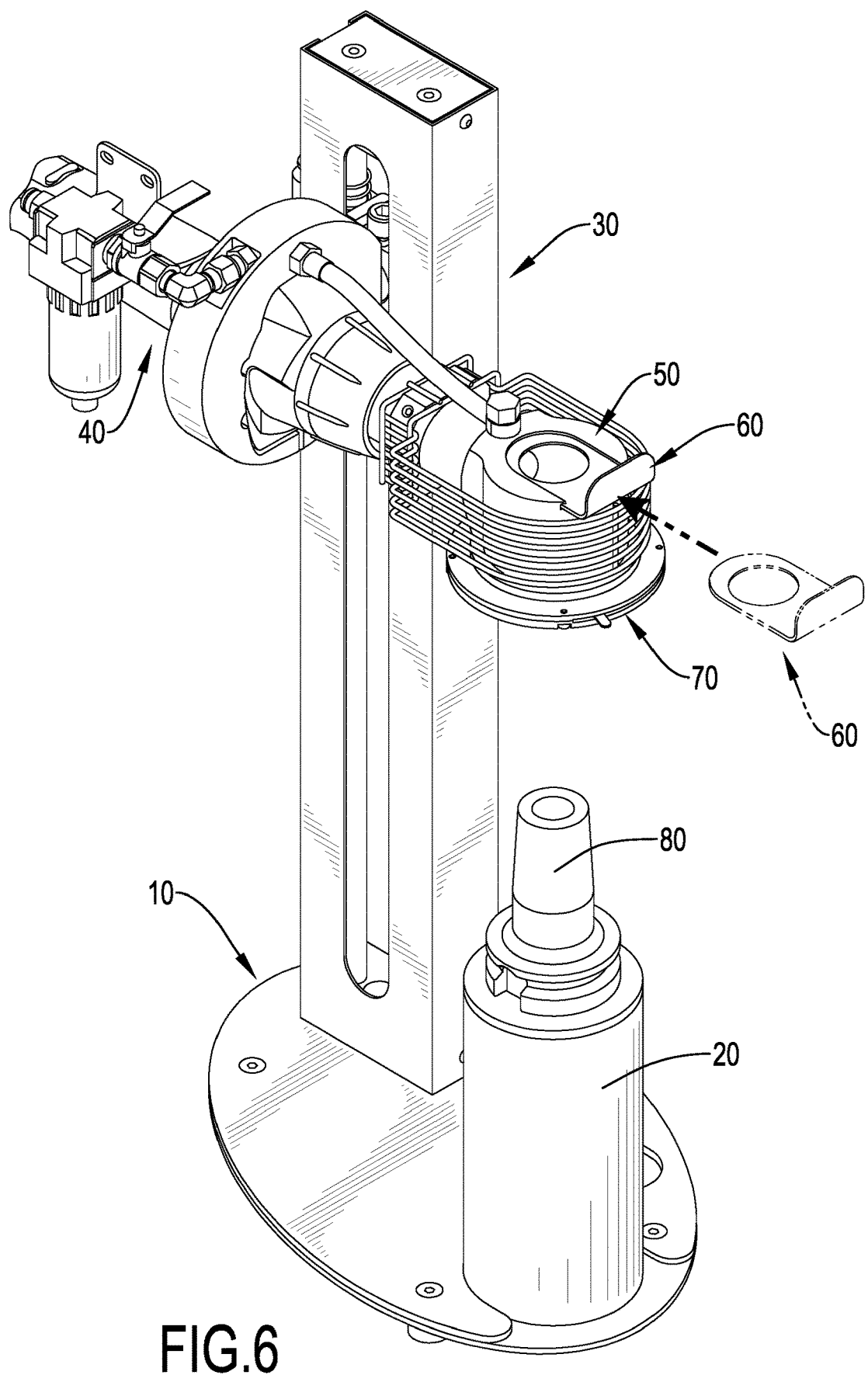
FIG. 6 is a schematic perspective view of the heater in FIG. 1.
Figure 7:
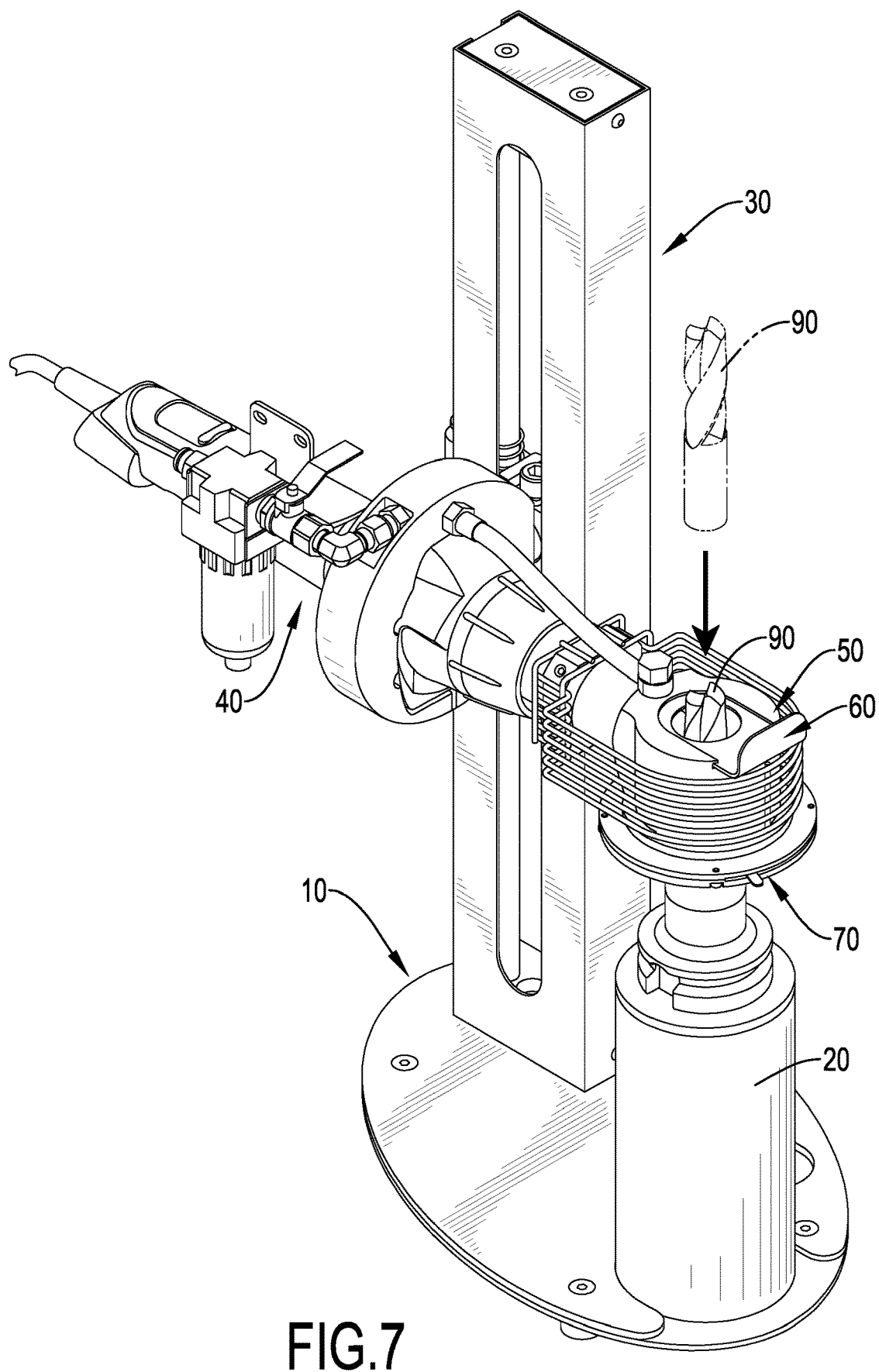
FIG. 7 is another schematic perspective view of the heater in FIG. 1.

With reference to FIGS. 2, 6, and 7, a chuck 80 is inserted into the chuck mount 20 for heating. The blocking body 61 of the blocking piece 60 is inserted into the guiding groove 53 of the heating cover 50 to block the first through hole 51 of the heating cover 50. The elevating assembly 30 drives the heat gun assembly 40, the heating cover 50, the blocking piece 60, and the adjustable blocking set 70 toward the chuck 80. The heating cover 50 is mounted on the chuck 80.

When the switching component 72 is operated to push the multiple blades 731A of the first blade assembly 73A and the multiple blades 731B of the second blade assembly 73B, the multiple blades 731A of the first blade assembly 73A and the multiple blades 731B of the second blade assembly 73B approach each other to block the second through hole 52 of the heating cover 50. The heat gun 41 of the heat gun assembly 40 inputs hot air into the heating cover 50 to heat up the chuck 80.

A cutter 90 is inserted into the chuck 80 via the communicating hole 62 of the blocking piece 60 to be connected to the chuck 80.

Compared to the conventional heater, the blocking piece 60 of the present invention is utilized to block the first through hole 51 of the heating cover 50, and the adjustable blocking set 70 of the present invention is utilized to block the second through hole 52 of the heating cover 50. With the blocking piece 60 and the adjustable blocking set 70, the discharge of the hot air provided by the heat gun 41 can be adjusted to achieve stable heating.

Figure 8:
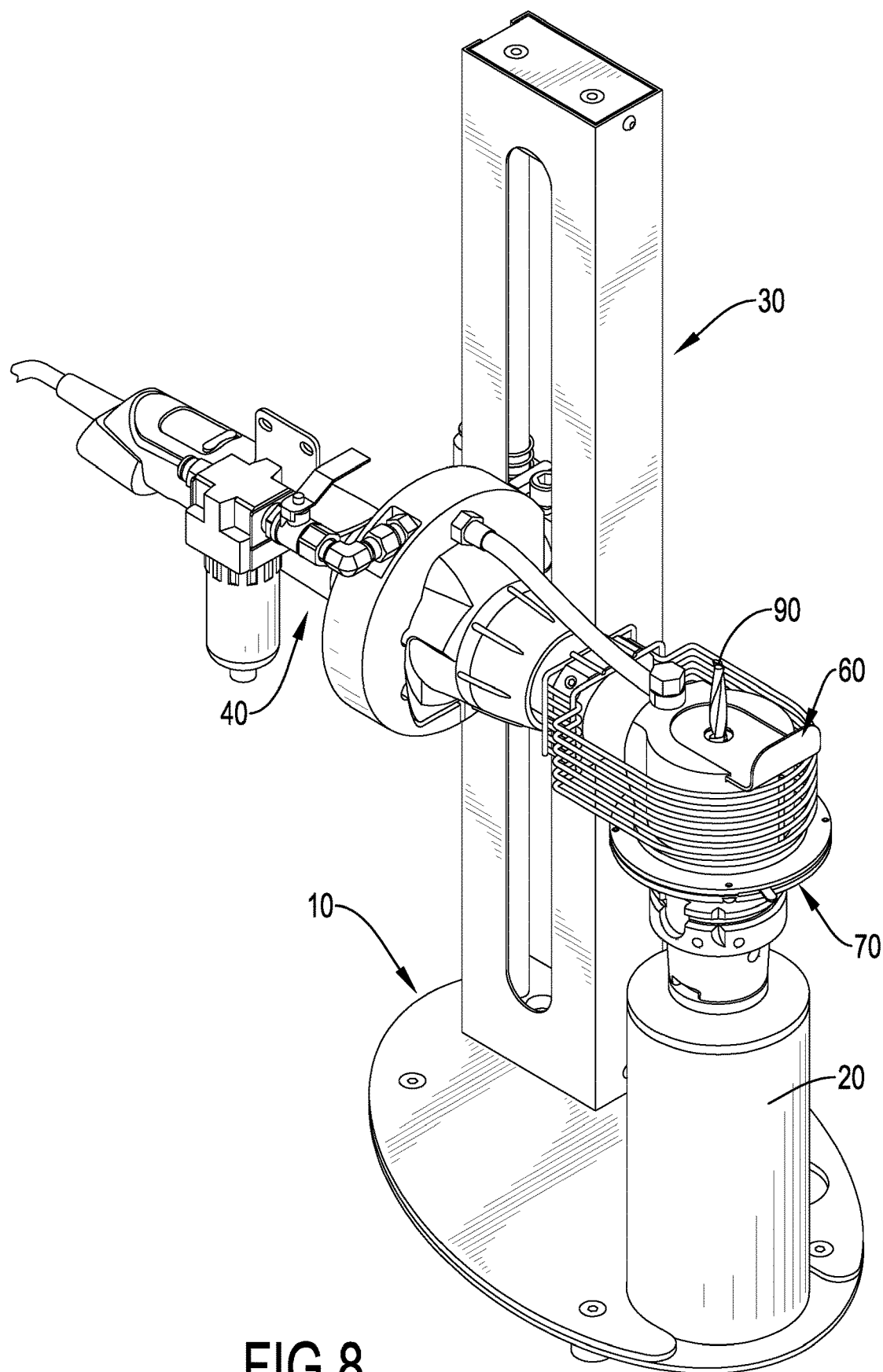
FIG. 8 is another perspective view of the heater in FIG. 1.

With reference to FIG. 8, the blocking piece 60 may be implemented as multiple blocking pieces 60. And the communicating holes 62 of the plural blocking pieces 60 are varied in size to correspond to cutters 90 of different sizes and types. The discharge of the hot air can be adjusted by replacing the blocking pieces 60.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A heater for shrink fit chucks comprising:
   a heat gun assembly having a heat gun having an air outlet for discharging hot air;
   a heating cover connected to the heat gun and having
      a first through hole;
      a second through hole; and
      a heating space disposed within the heating cover, extending along an extending direction to form the first through hole and the second through hole, and communicating with the air outlet of the heat gun;
   a blocking piece having
      a blocking body detachably connected to the heating cover to block the first through hole; and
      a communicating hole formed through the blocking body and capable of communicating with the first through hole;
   an adjustable blocking set connected to the heating cover and having
      a housing; and
      two blade assemblies mounted inside the housing and capable of blocking the second through hole and having
         multiple blades disposed annularly along the extending direction; and
      a switching component mounted inside the housing, rotatably disposed between the two blade assemblies, capable of pushing the multiple blades of each one of the two blade assemblies to move toward or depart from each other, and having a manual protrusion extending out of the housing.

2. The heater for shrink fit chucks as claimed in claim 1, wherein
   the switching component has
      multiple first guiding pillars disposed annularly along the extending direction; and
      multiple second guiding pillars disposed annularly along the extending direction;
      each one of the multiple first guiding pillars and each one of the multiple second guiding pillars protruding toward opposite directions;
   each one of the multiple blades of each one of the two blade assemblies has
      a guiding hole being elongated and curved;
   the multiple guiding holes of the multiple blades of one of the two blade assemblies respectively mounted on the multiple first guiding pillars of the switching component; and
   the multiple guiding holes of each one of the multiple blades of the other one of the two blade assemblies respectively mounted on the multiple second guiding pillars of the switching component.

3. The heater for shrink fit chucks as claimed in claim 2, wherein the two blade assemblies are angularly offset.

4. The heater for shrink fit chucks as claimed in claim 3, wherein
   the housing has
      multiple first pivoting pillars disposed annularly along the extending direction; and
      multiple second pivoting pillars disposed annularly along the extending direction;
      each one of the multiple first pivoting pillars and each one of the multiple second pivoting pillars protruding toward each other;
   each one of the multiple blades of each one of the two blade assemblies has
      a pivoting hole;
      the multiple pivoting holes of the multiple blades of one of the two blade assemblies respectively mounted on the multiple first pivoting pillars of the housing; and
      the multiple pivoting holes of the multiple blades of the other one of the two blade assemblies respectively mounted on the multiple second pivoting pillars of the housing.

5. The heater for shrink fit chucks as claimed in claim 4, wherein
   the multiple blades of each one of the two blade assemblies include two blades;
   the multiple first guiding pillars include two first guiding pillars;
   the multiple second guiding pillars include two second guiding pillars;
   the multiple second pivoting pillars include two first pivoting pillars; and
   the multiple second pivoting pillars include two second pivoting pillars.

6. The heater for shrink fit chucks as claimed in claim 5, wherein
   the heating cover has a guiding groove having a U-shaped contour and disposed adjacent to the first through hole; and the blocking body is capable of being inserted into the guiding groove to be detachably connected to the heating cover.

7. The heater for shrink fit chucks as claimed in claim 1, wherein the heating cover has a guiding groove having a U-shaped contour and disposed adjacent to the first through hole; and the blocking body is capable of being inserted into the guiding groove to be detachably connected to the heating cover.

8. The heater for shrink fit chucks as claimed in claim 2, wherein the heating cover has a guiding groove having a U-shaped contour and disposed adjacent to the first through hole; and the blocking body is capable of being inserted into the guiding groove to be detachably connected to the heating cover.

9. The heater for shrink fit chucks as claimed in claim 3, wherein the heating cover has a guiding groove having a U-shaped contour and disposed adjacent to the first through hole; and the blocking body is capable of being inserted into the guiding groove to be detachably connected to the heating cover.

\* \* \* \* \*